United States Patent [19]
Lehfeldt

[11] 3,899,661
[45] Aug. 12, 1975

[54] METHOD AND APPARATUS FOR ALTITUDE CAPTURE CONTROL FOR AIRCRAFT GUIDANCE SYSTEMS

[75] Inventor: James J. Lehfeldt, Olathe, Kans.

[73] Assignee: King Radio Corporation, Olathe, Kans.

[22] Filed: Aug. 27, 1973

[21] Appl. No.: 391,854

[52] U.S. Cl. ........ 235/150.2; 235/150.22; 244/77 D
[51] Int. Cl. .................. G01c 21/00; B64c 13/18
[58] Field of Search .................. 235/150.2, 150.22; 244/77 D, 77 A, 77 R

[56] References Cited
UNITED STATES PATENTS

| | | | |
|---|---|---|---|
| 3,524,612 | 8/1970 | Ainsworth et al. | 244/77 D |
| 3,545,703 | 12/1970 | Montvale et al. | 235/150.2 |
| 3,592,417 | 7/1971 | Simon | 244/77 D |
| 3,596,855 | 8/1971 | Barling | 244/77 D |
| 3,743,221 | 7/1973 | Lykken et al. | 244/77 D |

Primary Examiner—Malcolm A. Morrison
Assistant Examiner—Errol A. Krass
Attorney, Agent, or Firm—Lowe, Kokjer, Kircher

[57] ABSTRACT

A method and apparatus for controlling aircraft maneuvers enabling an aircraft to automatically achieve a preselected altitude from one previously selected. The system includes suitable circuitry and method steps for determining the rate of altitude change and summing means for comparing the rate of change with the difference between the known altitude and the preselected altitude. Detector means are provided to detect zero crossings from the output of the summing means. When zero crossings are detected, a logic signal is developed which is utilized to initiate an altitude capture signal to an associated autopilot or flight director. The altitude capture signal includes a fly through bias command to ensure that the flight director or autopilot maneuvers the aircraft through the preselected altitude. This signal is an input to a low pass filter which smoothes the capture signal and reduces the effect of premature or later capture maneuver initiations.

9 Claims, 2 Drawing Figures

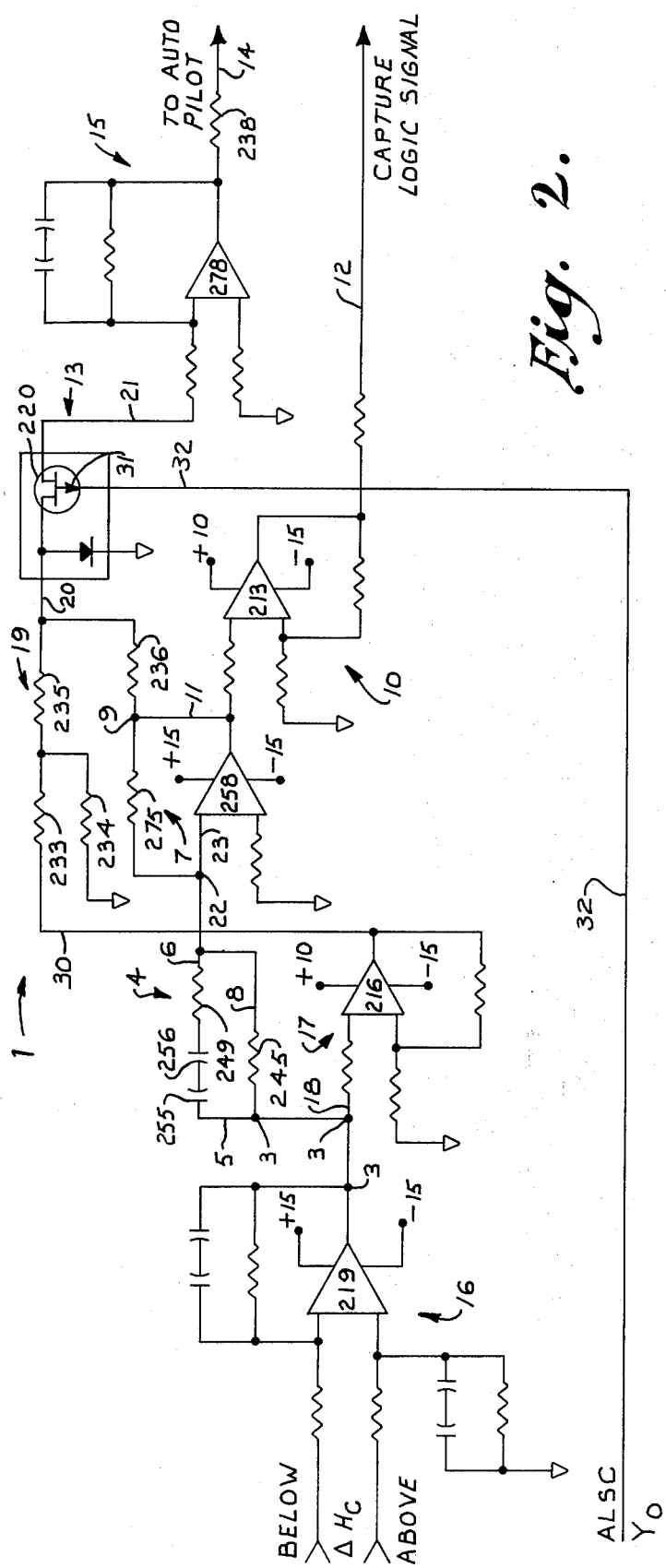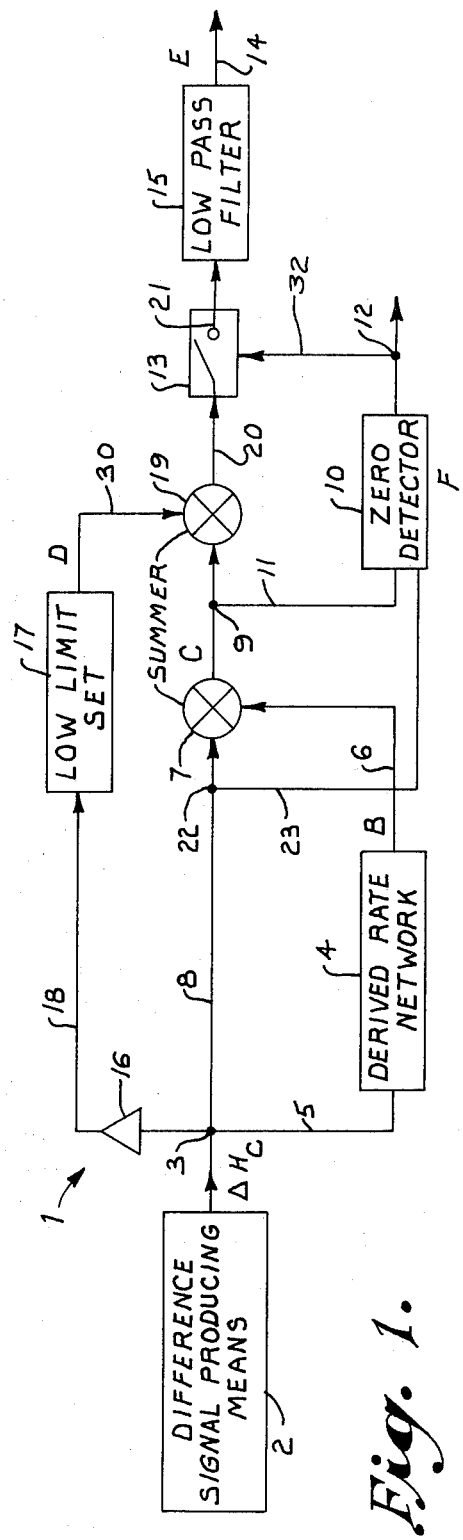
Fig. 2.
Fig. 1.

METHOD AND APPARATUS FOR ALTITUDE CAPTURE CONTROL FOR AIRCRAFT GUIDANCE SYSTEMS

BACKGROUND AND BRIEF DESCRIPTION OF THE INVENTION

The subject invention relates to the method and apparatus for altitude capture and has particular utility with flight directors and autopilots.

As suggested, the invention provides an apparatus and method for generating steering information to a flight director or autopilot system that will enable an aircraft to achieve a precise and smooth maneuver from an initial rate of ascent or descent to a zero rate of climb flight condition. That is, the invention enables an aircraft, and in particular general aviation aircraft, to change altitude easily and automatically.

While altitude capture control systems are known in the art, the subject invention differs from known prior art devices in that altitude change is achieved by use of a simple and relatively inexpensive device that requires only a single input. This input is an altitude differential designated herein as $\Delta H_c$ and is equal to $(H_s-H_b)$, where $H_s$ is a pilot selected altitude reference and $H_b$ is a linear analog representation of the known aircraft altitude as sensed by a barometric altimeter. The system is designed to perform altitude capture with aircraft rates of descent or ascent to 6,000 feet per minute.

One of the primary objects of this invention is to provide a unique method and apparatus for enabling an aircraft to maneuver to a new altitude easily and smoothly.

Another object of this invention is to provide method and apparatus for altitude capture requiring only a single input signal for the initiation of a capture signal.

Another object of this invention is to provide a unique method and apparatus for attaining a desired altitude by equipment which utilizes the actual aircraft altitude in determining the point to maneuver up or down to the desired altitude.

A further object of this invention is to provide an apparatus which ensures fly through of the desired altitude.

Yet another object of this invention is to provide means for smoothing the altitude capture command signal and to reduce the effects of early or late capture commands.

These and other objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts of the various views;

FIG. 1 is a block circuit diagram showing the unique circuit for initiating the proper aircraft maneuver to ensure altitude capture; and FIG. 2 is a more detailed schematic diagram of the circuit shown in FIG. 1.

Turning now more specifically to the method and apparatus that permits the computation of the maneuver initiation logic signal for altitude capture, it should be understood that the same may be utilized with either a flight director or an autopilot. The basic problem associated with altitude capture is knowing when to initiate the required aircraft maneuver. It is further desirable for this type of aircraft control system to cause the aircraft to "fly through" the desired altitude in order to engage the altitude hold mode of the subject system and to make the turn up or turn down maneuver in a smooth and regular manner. The device shown in FIG. 1 is configured to provide this desirable "fly through" bias. An altitude rate trim system may be used in conjunction with the device described herein in order to enable an aircraft to attain the precise pilot selected altitude. A system, especially compatible with the invention disclosed hereinafter, is described in the co-pending Lehfeldt United States application, entitled "METHOD AND APPARATUS FOR AUTOMATICALLY COMPUTING VERTICAL TRACK ANGLE" Ser. No. 387,209, filed Aug. 9, 1973 now U.S. Pat. No. 3,862,717.

Altitude capture circuitry or system of this device, generally indicated by the numeral 1 in the drawings, is actuated by a suitable state of the art difference signal producing means 2, which generates a $\Delta H_c$ signal input for the device 1. As indicated above, $\Delta H_c$ represents the difference between the altitude selected by the pilot, $H_s$ and the present aircraft altitude $H_b$, as sensed by a barometric altimeter. The $\Delta H_c$ signal forms an input to the device 1 at a connection node 3 and is used to derive both an aircraft altitude rate signal and a "fly through" bias signal. This signal ($\Delta H_c$) is the only effective input signal required for operation of the system.

The altitude differential signal $\Delta H_c$ forms an input to a rate deriving network 4 along a line 5, with the output of same being an electrical signal representative of altitude rate of change. This output is conveyed, via a conductor 6, to a summer 7.

The altitude rate signal is summed with the altitude differential $\Delta H_c$ signal, which is also inputted to summer 7 along a line 8. Output of the summer 7 appears at a connection node 9. If the aircraft is approaching the selected altitude $H_s$ at a constant rate, the output of the rate deriving network 4 will be a constant. The differential altitude $\Delta H_c$ will be decreasing and will be of opposite sign with respect to the altitude rate term appearing as the output of the rate deriving network 4. The amplitude of the differential altitude signal $\Delta H_c$ will decrease to a point where it will be equal and opposite to the altitude rate signal output of the rate deriving network 4. This condition is equivalent to a zero crossing at the node 9 which will be electrically sensed by zero crossing detector 10. Upon sensing the zero crossing, detector 10 generates an output signal along a conductor 12.

The output signal from the zero detector 10 is utilized by the system to close an altitude capture switch 13. Closing the altitude capture switch 13 initiates the aircraft bend over or capture command which is an output from the system on conductor 14, after passing through a low pass filter means 15.

The low pass filter means 15 smoothes abrupt steering inputs if they occur and also improves the output maneuver signal profile characteristics. The output of the low pass filter means 15, which forms an electrical input to the autopilot or flight director via the conductor 14, includes a "fly through" bias signal which ensures that the aircraft always will fly through the pilot selected altitude. The "fly through" bias signal portion is obtained by feeding the differential altitude signal $\Delta H_c$ through a high gain amplifier, generally indicated by the numeral 16 (see FIG. 1), and then feeding the output signal of the high gain amplifier 16, via a conductor 18, to a low limit set switch 17.

The output of the low limit set switch 17 is fed, through a line 30 to a summer 19 where it is mixed with the output of summer 7. The output of summer 19 is electrically connected to a first side of the altitude capture switch 13 by line 20 while the output side of the altitude capture switch 13 is connected to low pass filter means 15 by line 21.

As the aircraft flies through the pilot selected altitude $H_s$, it will be approaching a level flight condition. The altitude rate of change will be approaching zero and the $\Delta H_c$ signal will reverse sign as the aircraft passes through the selected altitude. This represents a zero crossing at the node 22, and zero detector 10 will output a second logic signal. The second logic signal is utilized to transfer the aircraft to an altitude hold mode and opens the altitude capture switch 13, thereby disconnecting the altitude capture system from the autopilot or flight director.

Referring now to FIG. 2, it may be observed that the altitude differential signal $\Delta H_c$ forms an input for the high gain amplifier 16 which includes an operational amplifier 219 having its output electrically connected to the node 3. As indicated with respect to FIG. 1, the altitude differential signal $\Delta H_c$ is an input for the rate deriving means 4 along the conductor 5 from the node 3. While a single reference numeral 3 is used to indicate the node 3, in FIG. 2, those skilled in the are recognize that the multiple connection points shown in the drawing are the equivalent of the single point shown in FIG. 1. Rate deriving means 4 is an RC network that includes a capacitor 255 and a capacitor 256 electrically connected in series with a resistor 249.

The altitude differential signal $\Delta H_c$ also is fed via a resistor 245 to the summer 7. The summer 7 includes a resistor 275, a first side of which is electrically connected to the node 9 which further includes a connection, via line 11, to zero detector 10. This detector (10) includes an operational amplifier 213 and is also electrically connected to a second side of resistor 275 at a node 22 by a conductor 23 which leads to an amplifier 258.

Limit set switch 17, connected to the node 3 by a line 18, includes an operational amplifier 216 having its output connected to the summer 19 by the line 30. In operation, the limit set switch 17 provides the "fly through" command to the autopilot or flight director so that the aircraft always flies through the pilot selected altitude. Finally, summer 19 is a resistive network including resistors 233, 234, 235 and 236 which are electrically connected to the altitude capture switch 13 by line 20.

Altitude capture switch 13 is a P-type field effect transistor 220 having a gate electrode 31 electrically connected to line 32. In this manner, the transistor is turned on and off by the output of the zero detector 10 which will appear on line 32. Line 32 is electrically coupled to line 12 by external autopilot circuitry. In any event, the altitude capture switch 13, is connected to the low pass filter means 15 by the line 21. The low pass filter means (15) includes an operational amplifier 278 having its output connected through a resistor 238 to the output line 14. Actuation of the switch 13 causes the output of the system to become an input for an associated autopilot or flight director while deactivation of the switch 13 removes the system from the aircraft control system.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A system for computing the initiation of an altitude capture maneuver for an aircraft, said system comprising:

means for providing a first electrical signal representing the altitude differential between a known aircraft altitude and a desired aircraft altitude;

means for deriving a second electrical signal representing the rate of aircraft altitude change;

means for summing said first and said second electrical signals thereby producing a third signal;

means interconnected by said third signal for detecting a zero indication;

means for generating a fly through bias signal in response to said first electrical signal;

means for adding said fly through bias signal to said third signal thereby generating an aircraft maneuver signal; and means responsive to said detecting means for switching said maneuver signal to an output line.

2. The system as in claim 1 wherein said second electrical signal is derived from said first electrical signal.

3. The system of claim 2 wherein said fly through bias generating means comprises:

a high gain amplifier means having an input and an output, said input connected to said first electrical signal; and a signal limit means having an input and an output, said input electrically connected to said output of said high gain amplifier means and said output interconnected with said adding means.

4. The combination as in claim 1 wherein said first electrical signal is delivered to said detecting means to open said switching means when said first electrical signal is zero.

5. In an autopilot system for controlling an aircraft maneuver that enables an aircraft to achieve a preselected aircraft altitude from a present aircraft altitude including means for determining the rate of altitude change of said aircraft, means for generating a difference signal corresponding to the difference between said present altitude and said preselected altitude, means for summing said rate of altitude change with the difference between said present aircraft altitude and said preselected aircraft altitude, and means responsive to said summing means for instituting an output signal to said autopilot system, the improvement which comprises:

means for generating a fly through bias signal in response to said difference signal; said generating means including a high gain amplifier having an output, and a signal limiting circuit having an output and an input electrically connected to the output of said amplifier means; and means interconnected with said limiting circuit output for adding said bias signal to the output of said summing means.

6. The improvement of claim 5 further characterized by low pass filter means, said low pass filter means having said output signal as an input.

7. A method of initiating an altitude capture command for an aircraft flight control system comprising the steps of:

applying a first signal representing the difference between present aircraft altitude and desired aircraft altitude to a summing means;

applying said first signal to a rate deriving network to obtain a second signal representing the rate of change of said aircraft altitude;

applying said second signal to said summing means thereby adding said first and said second signals;

initiating a third signal when the sum of said first and said second signals are zero;

deriving a fly through bias electrical signal from said first signal; and adding said bias signal to said third signal.

8. A system for initiating an aircraft maneuver comprising:

means for providing a first electrical signal representing the difference between a known altitude and a desired altitude;

means for providing a second electrical signal representing a rate of aircraft altitude change;

means for summing said first and said second electrical signals;

means for initiating a third electrical signal when the output of said summing means is zero;

means responsive to said third electrical signal for commanding an aircraft maneuver signal;

means for generating a fly through bias in response to said first electrical signal; and means for adding said fly through bias to said aircraft maneuver signal, said adding means being electrically connected to said first signal providing means and said third signal responsive means.

9. The system of claim 8 further characterized by low pass filter means electrically connected to the output of said third signal responsive means.

* * * * *